March 25, 1958 T. A. RICH 2,828,432
SPARKING DETECTOR FOR DYNAMOELECTRIC MACHINES
Filed Aug. 23, 1956
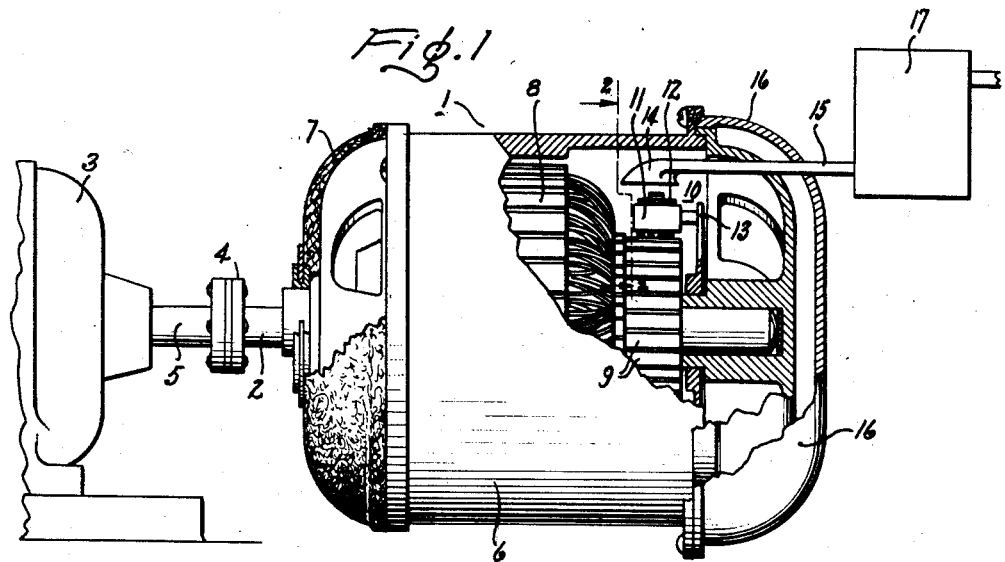
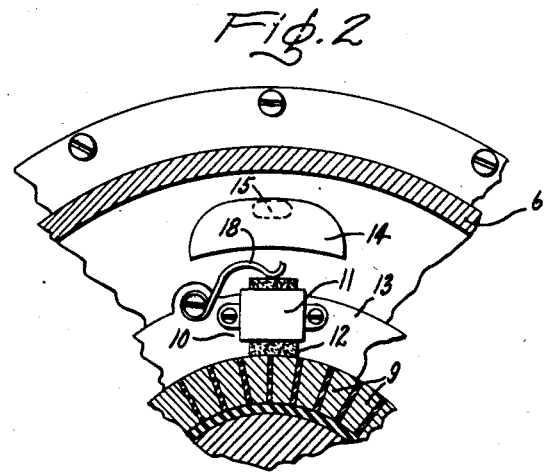
Inventor
Theodore A. Rich
by Merton D Morse
His Attorney

United States Patent Office 2,828,432
Patented Mar. 25, 1958

2,828,432

SPARKING DETECTOR FOR DYNAMOELECTRIC MACHINES

Theodore A. Rich, Schenectady, N. Y., assignor to General Electric Company, a corporation of New York Application August 23, 1956, Serial No. 605,902

7 Claims. (Cl. 310—220)

This invention relates to a method and apparatus for determining the optimum brush position in current collecting devices for dynamoelectric machines. More specifically, it relates to a method and apparatus for minimizing sparking at the brushes of current collecting devices such as commutators and slip rings.

Such dynamoelectric devices are classified either as alternating-current machines or direct-current machines depending on the nature of the current external to the machine itself. Thus, if the dynamoelectric device produces or operates from alternating-current, it is an alternating-current machine, whereas if the current in the external circuit is unidirectional or direct, it is a direct-current machine. The great majority of such machines require some type of rotating current collecting device such as commutators for direct-current machines and slip rings for alternating-current machines. One of the consequences of utilizing rotating current collecting devices is the problem of sparking at the brushes of the rotating current collecting devices.

Direct-current dynamoelectric devices, other than homopolar machines, contain commutating elements which function to maintain the current in the external circuit of the dynamoelectric device unidirectional. This commutation process gives rise to many problems in the operation of such direct-current machines. One of the most persistent of these problems is commutator brush sparking. This phenomenon consists of electrical sparks extending between the leading or trailing tips of the brushes and the commutator segments. The sparks which appear at the brushes may vary in magnitude from those not visible to the human eye to those which are relatively large and easily visible. Commutator brush sparking indicates poor commutation in the machine and may seriously damage both the brushes and the commutator segments.

Commutator brushes sparking usually occurs because of a lack of balance in the number of electrical factors during the commutation process. One of the major causes for commutator brush sparking, however, is the reactance voltage generated in the armature coils. Reactance voltage is an electromotive force generated in the coils due to the self and mutual inductance of the coils. That is, direct-current is led to or from the coils by the brushes and commutator. The current in each coil must thus reverse during the time that the commutator bars to which the coil is connected pass under a brush. Such a reversal requires a change of current from its full magnitude in one direction to the same magnitude in the opposite direction. This reversing current induces an electromotive force of self and mutual induction in the coils short circuited by a brush which opposes the current change. This electromotive force of self and mutual induction is called the reactance voltage, and tends to produce a spark as the trailing bar leaves the brush.

It is possible to minimize sparking and compensate for the reactance voltage by virtue of a counter electromotive force generated in the armature coil due to the cutting of flux by the armature coil. The counter electromotive force usually denominated as the commutating electromotive force opposes the reactance voltage. By properly adjusting the position of the brushes on a dynamoelectric machine it is possible to neutralize the reactance voltage by means of the commutating electromotive force and thus reduce the amount of sparking to an absolute minimum. In order to determine the optimum position for the brushes it is thus necessary to determine the degree of sparking for any given brush position.

In the past, one of the customary ways of measuring brush sparking has been by visual observation. While the human eye is fairly sensitive in observing tiny sparks, this method of observation does have serious inherent limitations. That is, the human eye lacks that degree of sensitivity in detecting sparking which is often both necessary and desirable in order to detect damaging sparking conditions. Furthermore, sparking may occur in portions of the dynamoelectric devices where visual observation is extremely difficult if not impossible. As a result, the method of visual observation although adequate in certain circumstances is one of limited utility.

Another prior art method of detecting commutator brush sparking utilizes radio noise. That is, the sparking at the brushes produces radio frequency noise which is detected and utilized as a measure of the degree of sparking. A detailed description of such a prior art method may be found in the article "Null point method of commutation adjustment," S. J. Roumanis, A. I. E. E. Paper No. 56-38 (1956). While this approach is satisfactory for many purposes, it has been found desirable to utilize other techniques.

It has been discovered that one of the consequences of sparking at the commutator or slip ring is a rather copious production of condensation nuclei. The presence of these nuclei provides a new and unique approach to the problem of spark detection.

Condensation nuclei is a generic name given to small airborne particles which are characterized by the fact that they serve as the nucleus on which water, for example, will condense to produce a cloud of droplets. Such condensation nuclei encompass microscopic and sub-microscopic particles, the most important segment of the size spectrum lying in a size range extending from approximately $2.5 \times 10^{-7}$ cm. radius, to $1 \times 10^{-5}$ cm. radius.

In utilizing condensation nuclei measuring techniques, an apparatus and method of a very high order of sensitivity may be achieved, since there are available condensation nuclei detecting devices having sensitivities of one part in $10^{14}$ by weight.

It is an object of this invention, therefore, to provide a method and apparatus for detecting and minimizing brush sparking at the current collecting devices by utilizing condensation nuclei measuring techniques.

A further object of this invention is to provide a highly sensitive method and apparatus for detecting the presence of sparking at the rotating current collecting devices in dynamoelectric machinery at levels below the visible range utilizing condensation nuclei techniques.

A further object of this invention is to provide a method for positioning commutator brushes for minimum sparking, by utilizing condensation nuclei measuring techniques.

Further objects of this invention will become apparent as the description of the invention proceeds.

In accordance with the invention, a novel apparatus for detecting brush sparking is disclosed, as well as a novel method for adjusting the brush position until an optimum position is achieved. The apparatus consists, briefly speaking, of air sampling means positioned adjacent to the commutator or slip ring structure of the dynamoelectric device. The output from the sampling means is connected to a condensation nuclei measuring device which provides an indication of the number of condensation nuclei produced by commutator or slip ring sparking and thus provides an index of the amount of sparking present. This apparatus will give a sensitive indication of commutator or slip ring sparking at levels below the visible range.

The novel method of the invention comprises the steps of sampling the air in the vicinity of the commutator or slip ring structure and measuring the condensation nuclei level as an index of the degree of sparking. The brush position is then adjusted until a minimum indication is obtained whereby the optimum brush position is achieved.

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawing, in which:

Figure 1, which illustrates a preferred embodiment, shows a view partially in cross section of the novel spark detecting and indicating apparatus.

Figure 2 shows in detail a portion of the apparatus of Figure 1 taken along the lines 2—2 of Figure 1.

Referring now to Figure 1, there is shown a dynamoelectric device 1, of the direct-current type, which may be either a motor or a generator. The dynamoelectric device 1 is coupled through a shaft 2, a coupling means 4, and a second shaft 5 to a rotating apparatus 3 which may be either a driving or driven member. That is, if the dynamoelectric device 1 is operated as a generator, the rotating apparatus 3 is a driving mechanism such as a motor, while the apparatus 3 will be a rotating load such as a generator if the dynamoelectric device 1 is utilized as a motor.

Enclosing one end of the dynamoelectric device 1 is a means for substantially removing all naturally occurring condensation nuclei present in the ventilating air entering the dynamoelectric device 1. To this end there is provided a pad 7 of glass wool or other fibrous material which encloses one end of the dynamoelectric device 1 and removes any naturally occurring condensation nuclei. Enclosing the other end of the dynamoelectric device 1 is a generally hemispherical hood member 16 which acts as a sealing element and thus functions, in conjunction with filtering element 7, to remove any naturally occurring condensation nuclei from the ventilating air drawn through the dynamoelectric device 1. In this manner substantially all of the ambient condensation nuclei are removed and those subsequently detected within the dynamoelectric device 1 are substantially attributable to the occurrence of brush sparking. Although the hood member 16 has been illustrated as having a hemispherical configuration, it is obvious, of course, that many other configurations may be utilized in lieu thereof.

The dynamoelectric device 1 comprises a housing 6 having mounted therein an armature 8 of standard configuration. Positioned at one end of the armature is a rotating current collecting structure, which in the illustrated embodiment is a commutator of the usual cylindrical configuration comprising a multiplicity of commutator segments 9. Mounted in sliding contact with the commutator segments 9 is a brush mechanism 10 which leads current in the armature circuit to or from the machine depending on the nature of its use, i. e., as a motor or a generator. The brush mechanism 10 is constituted of a brush holder 11 comprising a rectangular sleeve member having a brush 12 constituted of carbon or graphite positioned therein. An adjustable spring 18, most clearly seen in Figure 2, bears on top of the brush and maintains the desired contact pressure of the brush on the commutator. The brush mechanism 10 is attached to a rocker 13, illustrated schematically, which permits adjustment of the brush and brush holder position relative ot the commutator 9. The rocker mechanism 13 is fastened to the bearing housing and is rotatable to permit the adjustment of the brush position.

Positioned adjacent to the commutator and brush structure is a means to sample a portion of the air adjacent to the commutator structure. To this end there is provided an air scoop 14 which is located as close to the commutator as possible without touching it under conditions of vibration. The scoop 14 is connected to a conduit 15 which extends through the hood member 16 and is connected to a condensation nuclei meter 17 which measures the number of condensation nuclei present in the samples gathered by the air sampling scoop 14 to provide a measure of the amount of sparking at the commutator and brush structure 9 and 10.

The condensation nuclei meter 17 may be of the type disclosed in Patent Number 2,684,008, issued July 20, 1954, to Bernard Vonnegut. This instrument operates to count the condensation nuclei by causing the condensation of water vapor about them. This is achieved by bringing the relative humidity of the samples up to 100%. The air sample is then expanded adiabatically, causing the sample to become supersaturated. As a result, the moisture in the air sample condenses upon the nuclei present to form a cloud of small droplets. These droplets appear in the path of a beam of light causing a variation in the intensity by scattering a portion thereof. This change in intensity of the light beam is utilized to produce an electrical signal whose magnitude varies as a measure of the number of particles present.

Another apparatus which may be utilized to measure the number of condensation nuclei present, is the so-called Nolan counter, a description of which may be found in the Proceedings of the Royal Irish Academy, volume 51, section A.

The instant invention and its method of operation is grounded upon the discovery that sparking at the commutator brushes of a direct current dynamoelectric machine produces condensation nuclei, and that the more severe the sparking, the higher the nuclei count. It is believed that the condensation nuclei produced by commutator sparking are composed to a large part of sub-microscopic particles composed of brush and commutator materials. In addition, it may be possible that ions produced during the sparking may also produce an indication in the condensation nuclei measuring device.

The operation of the apparatus illustrating the invention may be described as follows: ventilating and cooling air is drawn into the dynamoelectric device 1 through the filtering means 7 constituted of glass wool fiber. Because of the presence of the filtering means, substantially all naturally occurring condensation nuclei present in the incoming ventilating air are removed. In this fashion the signal produced by the nuclei meter 17 is almost entirely due to condensation nuclei produced by the commutator sparking. Air samples in the vicinity of the commutator structure are periodically drawn off by the sampling scoop 14 and transmitted through the conduit 15 to the condensation nuclei measuring device 17 wherein the condensation nuclei are measured to provide an indication of the magnitude of the commutator brush sparking. The brush position is then changed and the condensation nuclei count produced by the measuring device 17 is again observed. The brush mechanism 10 is thus moved through a sequence of positions and the condensation nuclei count is obtained in each of the positions. The point or points at which a minimum count of condensation nuclei is produced is consequently the optimum brush position since the minimum amount of sparking occurs. Having found the optimum position, the commutator brush is fixed at this position. In this manner it is possible to determine the optimum brush position in a very rapid and accurate fashion since substantial nuclei readings are obtained even though there is no visible sparking.

Although the preferred embodiment illustrated in Figures 1 and 2 utilizes a filtering pad 7 to eliminate substantially all naturally occurring nuclei, it is to be understood that such a filtering element may be dispensed with whenever the surrounding air is not highly contaminated. The signals obtained from the nuclei measuring device are so large that sufficiently accurate adjustments can be made in most normal atmospheres. Only when the surrounding atmosphere is highly contaminated or an extremely high degree of accuracy is desired is it necessary to utilize a filtering element.

To demonstrate the validity of the invention, a series of tests were run which demonstrate the relationship between the condensation nuclei count for various boundary conditions such as ambient nuclei count, barely visible sparking count, and non-visible count.

*Brush sparking*

| Condition | Nuclei Count (Nuclei/cc.) |
|---|---|
| Room Air | 25,000 |
| Filtered Ventilating Air with dynamo unenergized (ambient level within dynamo) | 15,000 |
| No visible sparking | 40,000 |
| Barely visible sparking | 120,000 |
| Optimum Setting | 15,000 |

From an examination of the values recited in this table, it can be seen that the nuclei count increases to nearly eight times its original ambient value by the time barely visible sparking occurs. Furthermore, it can be seen that the nuclei count goes up substantially for conditions where no visible sparking is apparent, thus indicating that fairly serious sparking conditions may be present which cannot be detected by visual observation methods but which may be easily detected by utilizing the instant condensation nuclei measuring technique.

A further series of experiments were run in order to determine the effect on the nuclei count of adjusting the brush position, and the following results were obtained:

| Relative Brush Position (With an Arbitrary 0° Position) | Increase in Nuclei Count (Nuclei/cc. D) |
|---|---|
| 0° | 30,000 |
| 5° | 13,000 |
| 10° | 5,000 |
| 15° | 1,800 |
| 20° | 1,800 |
| 25° | 2,700 |
| 30° | 2,200 |
| 35° | 15,000 |

From an examination of this table it can be seen that the nuclei count varies through a wide range of values depending on the relative brush position. As a result, a very sensitive apparatus and method is provided which permits a clear-cut indication of the optimum brush positions.

Although in the embodiment of the invention which has been illustrated and discussed, the apparatus is external to the dynamoelectric device, with larger dynamoelectric machines having built-in brush adjustment mechanisms adjustable with load changes, the air collection system could easily be incorporated into the design of the apparatus. If the nuclei measuring device were thus attached and operated at all times, it is possible to provide a rapid and accurate indication of changes in brush conditions in such large machines.

Furthermore, it is quite obvious that the illustrated apparatus may easily be mounted in an integral test assembly for measuring a large number of dynamoelectric machines of the same size.

It is obvious that the apparatus and method just described will detect sparking due to causes other than faulty brush position. For example, if the surface of the current collecting device becomes roughened or contaminated, sparking occurs and may be detected and remedial action taken before serious damage occurs. Thus the instant invention presents an extremely flexible apparatus and method for the detection of sparking.

It should further be pointed out that the apparatus of the instant invention is not subject to errors due to pariculate matter caused by conditions other than sparking, such as wear products which cause an accumulation of visible dust. That is, the number of particles produced by sparking are so large compared to the wear products, that substantially no error is introduced by their presence and a very accurate picture of sparking conditions within the dynamoelectric device may be obtained.

It is clear from the previous description that there has been provided a method and an apparatus of an extremely high order of sensitivity for determining brush sparking conditions as well as for determining the optimum position for brushes to minimize such sparking.

While a particular embodiment of this invention has been shown, it will, of course, be understood that it is not limited thereto since many modifications both in the arrangement and in the instrumentalities employed may be made. It is contemplated by the appended claims to cover any such modifications as fall within the true spirit and scope of the invention.

What I claim as new and desire to secure by Letters Patent of the United States is:

1. In an apparatus for detecting sparking at the current collecting structure of dynamoelectric machines, the combination including means positioned adjacent to the current collecting structure of said machine to sample a portion of the air containing condensation nuclei formed by sparking, and means to measure the number of condensation nuclei as an index of the degree of sparking.

2. In an apparatus for detecting sparking at the current collecting structure of dynamoelectric machines, the combination of means to filter ventilating air entering said machines, means positioned adjacent to the current collecting structure of said machine to sample a portion of the air containing condensation nuclei formed by sparking, and means to measure the number of condensation nuclei as an index of the sparking.

3. In an apparatus for detecting invisible brush and commutator sparking in direct current dynamoelectric machines, the combination comprising filter means enclosing one open portion of said machine to remove all naturally occurring condensation nuclei present in ventilating air entering said machine, means enclosing the remaining open portion of said machine and including means positioned adjacent to the commutator structure of said machine to sample a portion of the air containing condensation nuclei formed by commutator sparking, and means to measure the number of condensation nuclei as an index of the commutator sparking.

4. A method for detecting sparking in a dynamoelectric machine, comprising the steps of periodically sampling the air in the vicinity of the current collecting structure, determining the number of condensation nuclei in the sample air as a measure of the amount of sparking.

5. A method for minimizing brush sparking at the current collecting structure of a dynamoelectric machine, comprising the steps of sampling the air in the vicinity of the structure, determining the condensation nuclei level in the sampled air as a measure of the degree of sparking, adjusting the relative position of the brush until an optimum position is located.

6. A method for detecting brush and commutator sparking in direct-current dynamoelectric machine, comprising the steps of removing all naturally occurring condensation nuclei from air flowing into said machine, sampling the air in the vicinity of the commutator, measuring the spark produced condensation nuclei level of the sampled air as an index of the degree of sparking.

7. A method for minimizing brush and commutator sparking in direct-current dynamoelectric machines, comprising the steps of removing naturally occurring condensation nuclei from air flowing through said machine, sampling the air in the vicinity of the commutator, measuring the spark produced condensation nuclei level of the sampled air as an index of the degree of sparking, adjusting the relative brush and commutator position until the measured nuclei level is at a minimum whereby an optimum commutating position is achieved.

References Cited in the file of this patent

UNITED STATES PATENTS

| | | |
|---|---|---|
| 531,821 | Wood | Jan. 1, 1895 |
| 2,523,017 | Harrison | Sept. 19, 1950 |
| 2,684,008 | Vonnegut | June 20, 1954 |